(12) United States Patent
Hu et al.

(10) Patent No.: US 10,037,336 B1
(45) Date of Patent: Jul. 31, 2018

(54) PERFORMING BLOCK DEDUPLICATION USING BLOCK SEQUENCE CLASSIFICATIONS

(71) Applicant: EMC Corporation, Hopkinton, MA (US)

(72) Inventors: Ying Hu, Northborough, MA (US); Richard P. Ruef, Santa Cruz, CA (US); Kurt W. Everson, Missouri City, TX (US); Ruiling Dou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 14/671,017

(22) Filed: Mar. 27, 2015

(51) Int. Cl.
*G06F 17/30* (2006.01)

(52) U.S. Cl.
CPC .. *G06F 17/30156* (2013.01); *G06F 17/30525* (2013.01); *G06F 17/30598* (2013.01); *G06F 17/30616* (2013.01)

(58) Field of Classification Search
CPC ......... G06F 17/30156; G06F 17/30525; G06F 17/30598; G06F 17/30616
USPC ....................................................... 707/692
See application file for complete search history.

(56) References Cited

U.S. PATENT DOCUMENTS

| | | | |
|---|---|---|---|
| 6,842,483 B1 * | 1/2005 | Au | H04N 19/533 375/240.16 |
| 7,992,037 B2 | 8/2011 | Dubnicki et al. | |
| 8,171,253 B2 | 5/2012 | Narayanasamy | |
| 8,332,372 B2 | 12/2012 | Tzur et al. | |
| 8,346,730 B2 * | 1/2013 | Srinivasan | G06F 17/3015 707/664 |
| 8,538,933 B1 * | 9/2013 | Hu | G06F 3/0641 707/692 |
| 8,572,053 B2 * | 10/2013 | Tofano | G06F 17/30336 707/692 |
| 8,682,870 B1 * | 3/2014 | Gardner | G06F 11/1469 707/692 |
| 8,805,796 B1 * | 8/2014 | Hu | G06F 3/0608 707/692 |
| 8,812,461 B2 * | 8/2014 | Li | G06F 17/30159 707/692 |
| 9,026,503 B2 | 5/2015 | Sharma et al. | |
| 9,183,218 B1 | 11/2015 | Wallace et al. | |
| 2009/0019345 A1 * | 1/2009 | Kaufman | G06F 17/30312 714/807 |
| 2009/0271402 A1 * | 10/2009 | Srinivasan | G06F 17/3015 |

(Continued)

*Primary Examiner* — Ashish K Thomas
*Assistant Examiner* — Abdullah Daud
(74) *Attorney, Agent, or Firm* — BainwoodHuang

(57) ABSTRACT

A computer-implemented technique performs block deduplication. The technique involves generating a list of candidate blocks and adding classifications to the list of candidate blocks. The classifications classify the candidate blocks on the list into different categories based on a set of block sequence matching criteria. The technique further involves performing, based on the classifications added to the list of candidate blocks, further block deduplication processing on first candidate blocks having a first classification while not performing further block deduplication processing on second candidate blocks having a second classification. Examples of the categories include an "exact long match" category, a "disrupted long match" category, a "loosely long match" category, and a "short match" category.

18 Claims, 6 Drawing Sheets

(56) References Cited

U.S. PATENT DOCUMENTS

| | | | |
|---|---|---|---|
| 2010/0071064 A1* | 3/2010 | Weber | G06F 21/564 |
| | | | 726/24 |
| 2010/0198797 A1* | 8/2010 | Wideman | G06F 17/30156 |
| | | | 707/692 |
| 2011/0016091 A1* | 1/2011 | Prahlad | G06F 11/1453 |
| | | | 707/654 |
| 2011/0099351 A1* | 4/2011 | Condict | G06F 3/0608 |
| | | | 711/216 |
| 2014/0286392 A1* | 9/2014 | Lim | H04N 19/619 |
| | | | 375/240.02 |

* cited by examiner

PERFORMING BLOCK DEDUPLICATION USING BLOCK SEQUENCE CLASSIFICATIONS

BACKGROUND

Data block deduplication for secondary storage is a process of finding multiple instances of the same data block, and storing just a single instance of that data block in secondary storage. The multiple objects that contain that data block (e.g., a logical unit of storage or LUN, a file, etc.) are then adjusted to refer to that single instance. Such a process conserves space within secondary storage.

One conventional approach to finding multiple instances of the same data block involves calculating a hash of each data block. These hashes are then scanned for duplicate hashes. If duplicate hashes are found, the data blocks corresponding to the duplicate hashes are then compared to confirm that the data blocks are the same.

SUMMARY

Unfortunately, there are drawbacks to the above-described conventional approach to simply finding the same data block and storing just a single instance of that data block in secondary storage. For example, suppose that a single data block instance in the middle of a frequently accessed long sequence of data blocks is found to match an earlier-stored instance of the same data block and is thus deduplicated. That is, the long sequence is no longer kept intact, but instead is fragmented into three non-contiguous portions, i.e., an initial portion that is not deduplicated, a single data block middle portion which is deduplicated, and an end portion which is not deduplicated. As a result, subsequent accesses of the entire sequence may suffer from less efficient read operations (e.g., skipping to different disk drive locations) and longer latencies (e.g., waiting multiple seek times). As time passes, the particular long sequence may become defragmented even further by additional deduplication activity of single or short sequence instances, and other long sequences may become fragmented as well leading to further operational deficiencies.

In contrast to the above-described conventional deduplication approach which does not distinguish between long and short block sequences and thus can promote fragmentation of long block sequences, improved techniques are directed to performing block deduplication using block sequence classifications. Such classifications may be based on a set of block sequence matching criteria and thus enable categorization of different block sequences (e.g., a perfectly matching long block sequence, a long block sequence with some disruptions, a long block sequence of the same blocks but in a different order, a short block sequence, etc.). Accordingly, a user can decide what type of deduplication to perform (e.g., deduplicate only perfectly matching long block sequences, deduplicate all long block sequences even those with blocks out of order, deduplicate all matching blocks, and so on). Such a feature enhances the user's ability to finely tune storage operations.

One embodiment is directed to a computer-implemented method of performing block deduplication. The computer-implemented method includes generating a list of candidate blocks (e.g., a list of deduplication requests) and adding classifications to the list of candidate blocks. The classifications classify the candidate blocks on the list into different categories based on a set of block sequence matching criteria. The computer-implemented method further includes performing, based on the classifications added to the list of candidate blocks, further block deduplication processing on first candidate blocks having a first classification while not performing further block deduplication processing on second candidate blocks having a second classification.

In some arrangements, the classifications include: an "exact long match" category, a "disrupted long match" category, a "loosely long match" category, and a "short match" category. In these arrangements, adding the classifications to the list of candidate blocks includes labeling each candidate block on the list as belonging to one of the "exact long match" category, the "disrupted long match" category, the "loosely long match" category, and the "short match" category.

In some arrangements, the method further includes receiving, as a first block sequence matching criterion, a minimum deduplication length value, and receiving, as a second block sequence matching criterion, a maximum disruption length value. In these arrangements, labeling each candidate block on the list is based on the minimum deduplication length value and the maximum disruption length value.

In some arrangements, adding the classifications to the list of candidate blocks includes labeling at least some of the first candidate blocks as belonging to "exact long match" sequences, and labeling at least some of the second candidate blocks as belonging to "short match" sequences.

In some arrangements, performing the further block deduplication processing on the first candidate blocks having the first classification while not performing the further block deduplication processing on the second candidate blocks having the second classification includes verifying that data in the first candidate blocks truly matches data which was previously stored on a set of storage devices while ignoring whether data in the second candidate blocks truly matches data which was previously stored on the set of storage devices.

In some arrangements, the method further includes deduplicating, after verifying that the data in the first candidate blocks truly matches data which was previously stored on a set of storage devices, all first candidate blocks having data which truly matches data which was previously stored on the set of storage devices.

In some arrangements, the method further includes receiving, as one of the block sequence matching criteria, a minimum deduplication length value. In these arrangements, each "exact long match" sequence includes a sequence of adjacent blocks which is at least the minimum deduplication length value in length. Additionally, each "short match" sequence includes a sequence of adjacent blocks which is less than the minimum deduplication length value in length.

In some arrangements, adding the classifications to the list of candidate blocks further includes labeling at least some of the first candidate blocks as belonging to "disrupted long match" sequences.

In some arrangements, the method further includes receiving, as another of the block sequence matching criteria, a maximum disruption length value. In these arrangements, each "disrupted long match" sequence includes a sequence of adjacent blocks which is at least the minimum deduplication length value in length and which includes a disrupted portion which is less than or equal to the maximum disruption length value in length.

In some arrangements, adding the classifications to the list of candidate blocks further includes labeling at least some of the first candidate blocks as belonging to "loosely long match" sequences. In these arrangements, each "loosely long match" sequence includes a sequence of adjacent blocks which is at least the minimum deduplication length value in length and which includes a disrupted portion which is greater than the maximum disruption length value in length.

Another embodiment is directed to data storage equipment which includes a host interface to communicate with an external host computer, memory, and control circuitry coupled to the host interface and the memory. The memory stores instructions which, when carried out by the control circuitry, cause the control circuitry to:
(A) generate a list of candidate blocks, each candidate block on the list having been received by the data storage equipment through the host interface,
(B) add classifications to the list of candidate blocks, the classifications classifying the candidate blocks on the list into different categories based on a set of block sequence matching criteria, and
(C) based on the classifications added to the list of candidate blocks, perform further block deduplication processing on first candidate blocks having a first classification while not performing further block deduplication processing on second candidate blocks having a second classification.

Yet another embodiment is directed to a computer program product having a non-transitory computer readable medium which stores a set of instructions to perform block deduplication. The set of instructions, when carried out by computerized circuitry, causing the computerized circuitry to perform a method of:
(A) generating a list of candidate blocks;
(B) adding classifications to the list of candidate blocks, the classifications classifying the candidate blocks on the list into different categories based on a set of block sequence matching criteria; and
(C) based on the classifications added to the list of candidate blocks, performing further block deduplication processing on first candidate blocks having a first classification while not performing further block deduplication processing on second candidate blocks having a second classification.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing block deduplication using block sequence classifications.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing block deduplication using block sequence classifications. Such classifications may be based on a set of block sequence matching criteria and thus enable categorization of different block sequences (e.g., a perfectly matching long sequence, a long sequence with some disruptions, a long sequence of the same blocks but in no matching order, a short sequence, etc.). Accordingly, a user such as a data storage administrator can decide what type of deduplication to perform (e.g., deduplicate only perfectly matching long sequences, deduplicate all long sequences even those with blocks out of order, deduplicate all matching blocks, and so on). Such a deduplication feature enhances the user's ability to finely tune storage operations, e.g., strike a balance between optimizing storage efficiency and reducing fragmentation.

Figure 1:
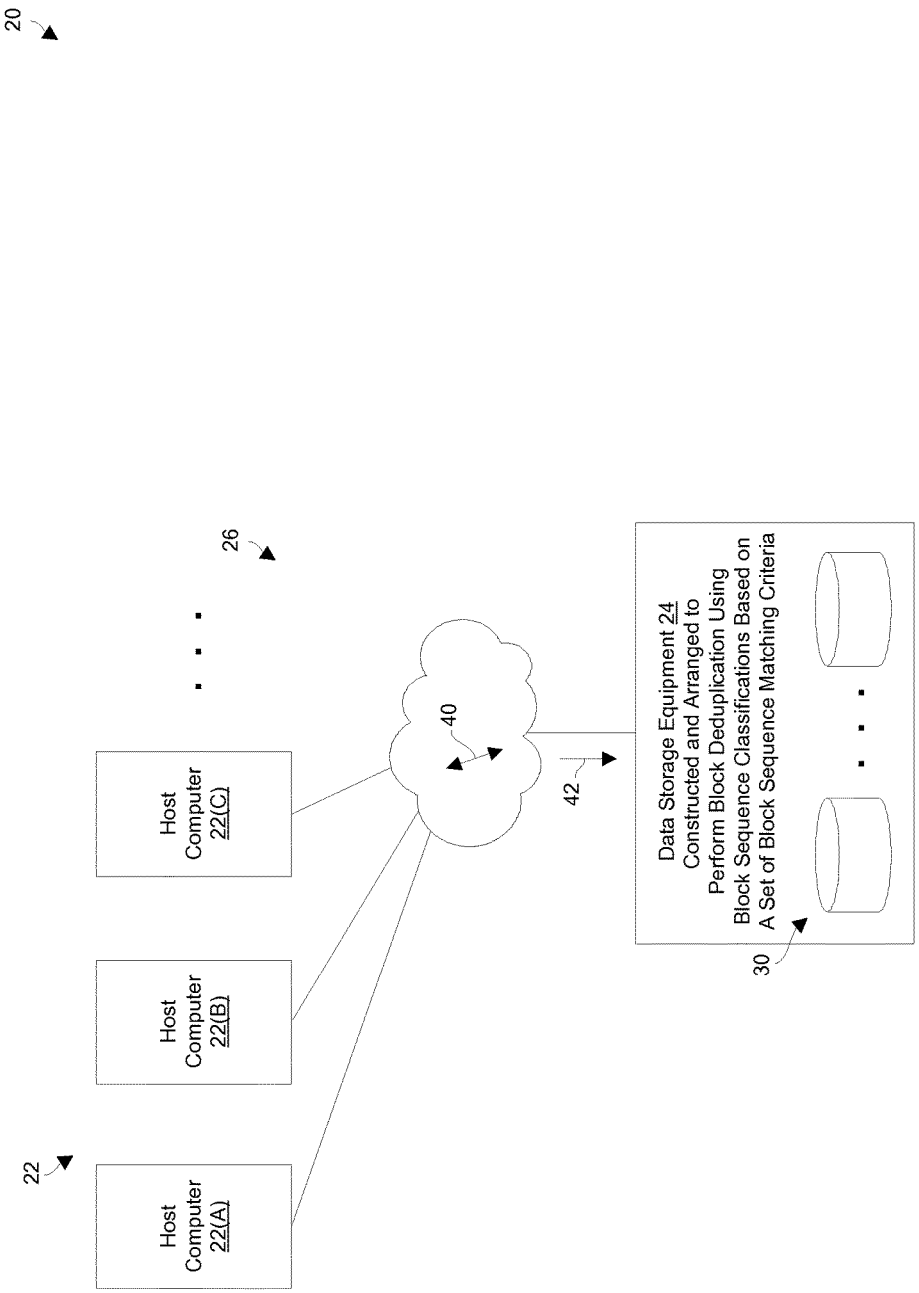
FIG. 1 is a block diagram of an electronic environment which is suitable for deduplication using block sequence classifications.

FIG. 1 shows an electronic environment 20 which is suitable for block deduplication using block sequence classifications. The electronic environment 20 includes host computers 22(A), 22(B), 22(C), . . . (collectively, host computers 22), data storage equipment 24, and communications medium 26.

Each host computer 22 is constructed and arranged to perform useful work. Along these lines, the host computers 22 may be server devices such as enterprise servers, file servers, email servers, web servers, content servers, application servers, and so on. Alternatively, the host computers 24 may be client devices such as desktop computers, tablets, smartphones, etc. In some arrangements, the host computers 22 include both server devices and client devices. Such host computers 24 store host data in and retrieve host data from the data storage equipment 24.

The data storage equipment 24 is constructed and arranged to provide robust and reliable access to host data on behalf of the host computers 22. Along these lines, the data storage equipment 24 includes a set of storage devices 30 which provides secondary storage (e.g., flash memory boards, flash memory storage drives, magnetic storage drives, etc.), and performs enhanced deduplication operations on the set of storage devices 30 to enable efficient use of secondary storage space.

The communications medium 26 is constructed and arranged to connect the various components of the electronic environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic communications devices and cabling, wireless communications devices, combinations thereof, etc. Furthermore, the communications medium 26 is capable of supporting LAN-based communications, SAN-based communications, cellular communications, combinations thereof, etc.

During operation, the data storage equipment 24 performs useful work such as performing host initiated I/O operations in response to host I/O commands 42 from the host computers 22. During such operation, the data storage equipment 24 classifies candidate blocks into different categories depending how the blocks belong to block sequences (i.e., based on a set of block sequence matching criteria). The data storage equipment 24 then attempts to deduplicate only particular categories of candidate blocks based on user configuration. Accordingly, a user can direct the data storage equipment 24 to deduplicate certain types of block sequences but not all blocks or block sequences to reduce fragmentation. Such user configuration can be modified over time so that the user can fine tune the deduplication behavior of the data storage equipment 24 based on the particular norms of the data storage equipment 24, i.e., based on specific characteristics of the data which is typically handled by the data storage equipment 24.

For example, based on the set of block sequence matching criteria, the data storage equipment 24 can classify deduplication candidate blocks depending on whether the blocks belong to long exact matching block sequences (e.g., a string of M exact matching blocks where M is 8, 16, ..., etc.), long matching block sequences with some disruption (e.g., with up to N blocks out of order where N is 2, 3, 4, ..., etc.), long matching block sequences with no regard to order, short block sequences, etc. Then, based on user configuration, the data storage equipment 24 can deduplicate any or all of the classified candidate blocks based on their classification. Further details will now be provided with reference to FIG. 2.

Figure 2:
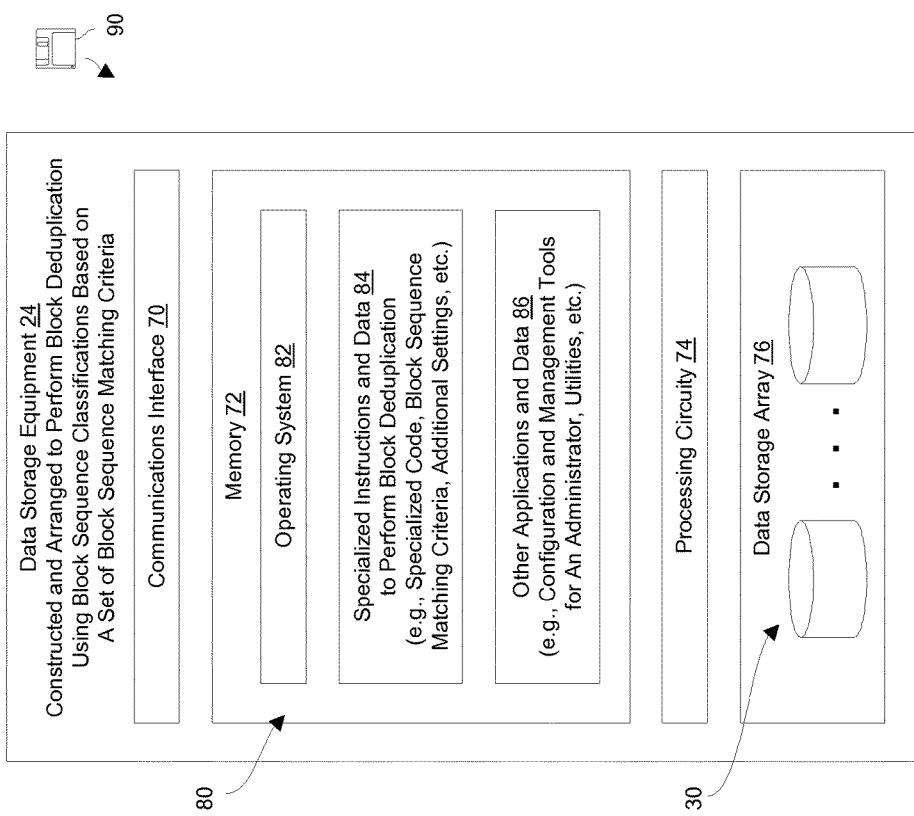
FIG. 2 is a block diagram of data storage equipment which deduplicates data blocks using the block sequence classifications.

FIG. 2 shows particular details of the data storage equipment 24 of FIG. 1. The data storage equipment 24 includes a communications interface 70, memory 72, processing circuitry 74, and a data storage array 76.

The communications interface 70 is constructed and arranged to connect the data storage equipment 24 to the communications medium 26 to enable communications with other components of the electronic environment 20 (FIG. 1). Such communications may be IP-based, SAN-based, cellular-based, cable-based, fiber-optic based, wireless, combinations thereof, and so on. Accordingly, the communications interface 70 enables the data storage equipment 24 to robustly and reliably communicate with external devices such as the host computers 22.

The memory 72 is intended to represent both volatile storage (e.g., DRAM, SRAM, etc.) and non-volatile storage (e.g., flash memory, magnetic memory, etc.). The memory 72 stores a variety of software constructs 80 including an operating system 82 to manage resources of the data storage equipment 24 (e.g., processor cycles, memory space, etc.), specialized instructions and data 84 to perform block deduplication using the set of block sequence matching criteria, and other applications and data 86 (e.g., configuration and management tools for a data storage administrator, utilities, other user level applications, and so on).

The processing circuitry 74 is constructed and arranged to operate in accordance with the various software constructs 80 stored in the memory 72. Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the data storage equipment 24. In particular, the computer program product 90 has a non-transitory (or non-volatile) computer readable medium which stores a set of instructions which controls one or more operations of the data storage equipment 24. Examples of suitable computer readable storage media include tangible articles of manufacture and apparatus which store instructions in a non-volatile manner such as CD-ROM, flash memory, disk memory, tape memory, and the like.

The data storage array 76 houses the set of storage devices 30 forming secondary storage. In some arrangements, the data storage array 76 includes multiple array enclosures for high capacity storage (e.g., multiple RAID groups, tiered storage, etc.). Additionally, in some arrangements, non-volatile storage which persistently holds the software constructs 80 resides within the data storage array 76.

During operation, the data storage equipment 24 performs useful work. In particular, the processing circuitry 74 executes the various software constructs 80 to form specialized storage processing circuitry which loads and stores host data on behalf of the external host computers 22 (also see FIG. 1). Additionally, the processing circuitry 74 executes other code such as the specialized instructions and data 84 to perform block deduplication using block sequence classifications based on a set of block sequence matching criteria.

In a particular arrangement, the data storage equipment 24 is constructed and arranged to classify block sequences into four difference classifications or categories: an "exact long match" category, a "disrupted long match" category, a "loosely long match" category, and a "short match" category. The first three categories (i.e., "exact long match", "disrupted long match", and "loosely long match") refer to "long" block sequences which have at least M blocks. The last category (i.e., "short match") refers to a block sequence which as less than M blocks.

The block sequence matching criteria includes a minimum deduplication length parameter and a maximum disruption length parameter. The minimum deduplication length parameter defines a length M, i.e., the length of a "long" block sequence. Suitable values for M include 8 blocks, 16 blocks, and so on.

Additionally, the maximum disruption length parameter defines a length N. If a "long" block sequence has an out-of-order portion which N blocks or less in length, that "long" block sequence is referred to as a "disrupted long match" sequence. However, if the "long" block sequence has an out-of-order portion which greater than N blocks in length, that "long" block sequence is referred to as a "loosely long match" sequence (i.e., a "long" block sequence with most or all blocks out of order). Suitable values for N include 1, 2, 3, 4, and so on.

Based on the above-provided classifications and parameter definitions, suppose that the user sets the minimum deduplication length parameter M to be 8 (i.e., a "long" sequence is at least 8 blocks in length). Further suppose that the user sets the maximum disruption length parameter N to be 2 (i.e., a "long" sequence with at most 2 blocks out of order is considered to be a "disrupted long match" sequence). Also, suppose that the data storage equipment 24 initially stores the following example block sequence in secondary storage: ABCDEFGH (i.e., each letter uniquely represents a block of data).

With the above-provided example details in place, the data storage equipment 24 is able to classify new block sequences for possible deduplication. For example, the following new example block sequence is considered to be an "exact long match" sequence: ABCDEFGH. That is, this new example block sequence is at least the minimum deduplication length M in length (8 in this example). Accordingly, the data storage equipment 24 considers this new example block sequence to be a "long" block sequence. Moreover, this new example block sequence is in the exact order as the initial example block sequence. Accordingly, the new example block sequence exactly matches the initial example block sequence and is classified as an "exact long match" sequence.

As another example, the following new example block sequence is considered to be a "disrupted long match" sequence: ABCEDFGH. That is, this new example block sequence is at least the minimum deduplication length M in length (8 in this example). Accordingly, the data storage equipment 24 considers this new example block sequence to be a "long" block sequence. Furthermore, this new example block sequence has only two blocks which are out of order compared to the original example block sequence (i.e., blocks ED) and thus has at most the maximum disruption length N number of blocks out of order (2 in this example). Accordingly, the new example block sequence closely matches the initial example block sequence and is classified as a "disrupted long match" sequence.

As yet another example, the following new example block sequence is considered to be a "loosely long match" sequence: BADEFGHC. That is, this new example block sequence is at least the minimum deduplication length M in length (8 in this example). Accordingly, the data storage equipment 24 considers this new example block sequence to be a "long" block sequence. However, this new example block sequence compared to the original example block sequence has more than the maximum disruption length N number of blocks out of order (i.e., all of the blocks are out of order). Accordingly, the new example block sequence loosely matches the initial example block sequence and is classified as a "loosely long match" sequence.

For yet another example, the following new example block sequence is considered to be a "short match" sequence: EFG, which has three blocks that match the original example block sequence of ABCDEFGH. That is, this new example block sequence is less than the minimum deduplication length M (8 in this example) in length. Accordingly, the data storage equipment 24 considers this new example block sequence to be a "short match" sequence.

At this point, it should be understood that a user of the data storage system 24 (e.g., a data storage administrator) is able to direct which categories of block sequences are deduplicated by the data storage system 24. For example, the user can direct the data storage system 24 to deduplicate only "exact long match" sequences. In this situation, the data storage equipment 24 ignores all of the other types of sequences during deduplication. Accordingly, "disrupted long match", "loosely long match", and "short match" sequences are not deduplicated.

As another example, the user can direct the data storage system 24 to deduplicate all types of "long" sequences (i.e., "exact long match", "disrupted long match", and "loosely long match" sequences), but not deduplicate "short" sequences. In this situation, the data storage equipment 24 ignores only "short match" sequences during deduplication. Other selections and combinations are suitable for use as well. Further details will now be provided with reference to FIGS. 3 and 4 and a set of examples.

Figure 3:
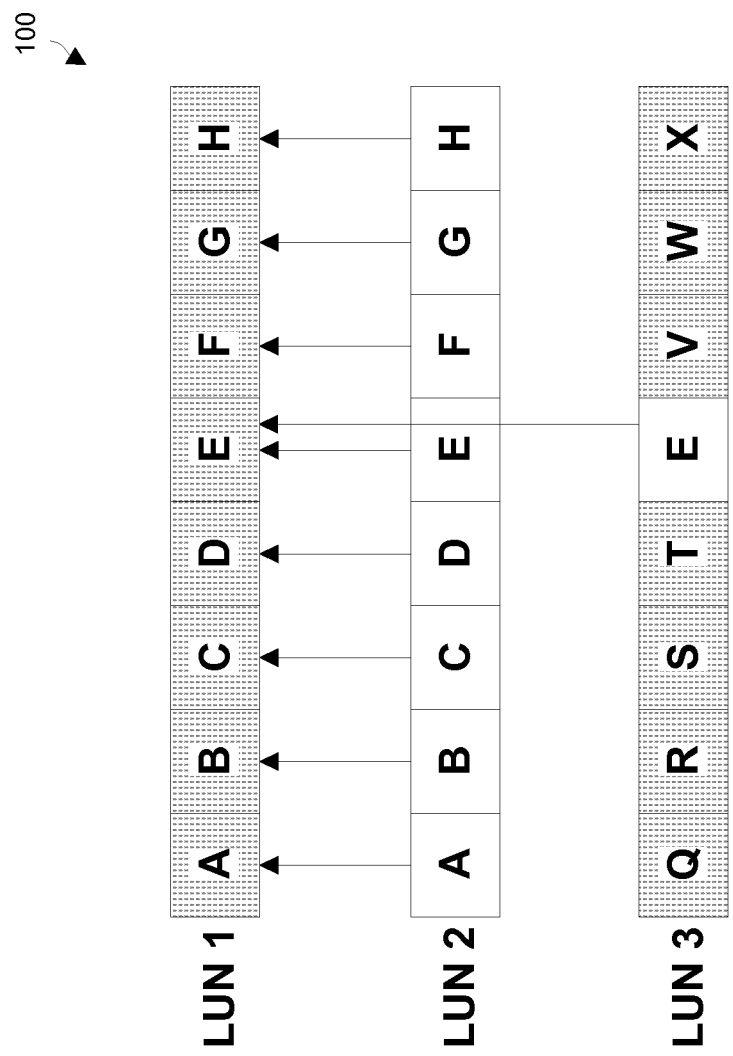
FIG. 3 is an example of block deduplication which is performed by the data storage equipment of FIG. 2 when operating in accordance with a first mode.
Figure 4:
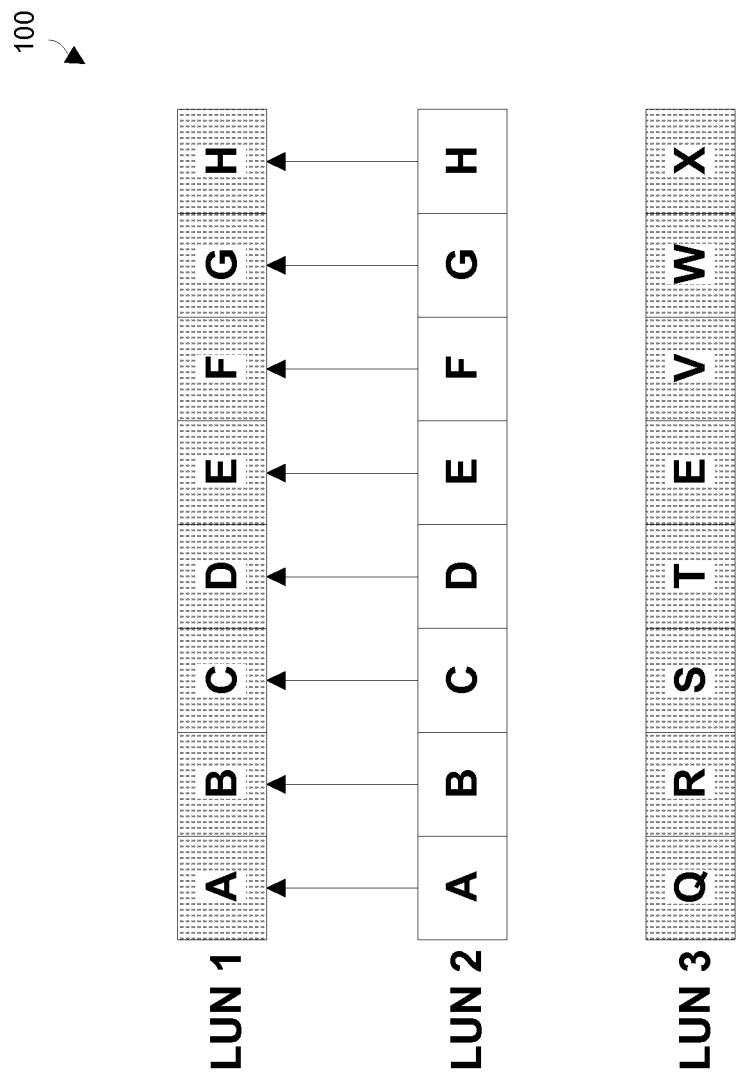
FIG. 4 is an example of block deduplication which is performed by the data storage equipment of FIG. 2 when operating in accordance with a second mode.

FIGS. 3 and 4 illustrate different example block deduplication activities which are available with the data storage equipment 24 (also see FIG. 2). FIG. 3 shows a first example block deduplication result provided by the data storage equipment 24 when operating in a first mode or in accordance with a first set of sequence selections from the user. FIG. 4 shows a second example block deduplication result provided by the data storage equipment 24 when operating in a second mode or in accordance with a second set of sequence selections from the user.

For both FIGS. 3 and 4, suppose that the set of storage devices 30 of the data storage equipment 24 stores three LUNs, namely, LUN 1, LUN 2, and LUN 3. Further suppose that LUN 1 contains a sequence ABCDEFGH of data blocks 100. Likewise, suppose that LUN 2 contains another sequence ABCDEFGH of data blocks 100. Additionally, suppose that LUN 3 contains another sequence QRSTEVWX of data blocks 100.

Now suppose that the user directs the data storage equipment 24 to deduplicate all categories of block sequences. As shown in FIG. 3, the data storage equipment 24 deduplicates the block sequence ABCDEFGH in LUN 2 since LUN 1 already stores the same block sequence ABCDEFGH (the blocks 100 of LUN 1 are shaded to indicate real data and the blocks 100 of LUN 2 are unshaded to indicate deduplication of all of the blocks of LUN 2). Additionally, as further shown in FIG. 3, the data storage equipment 24 deduplicates block E since LUN 1 already stores block E (only block E of LUN 3 is unshaded to indicate deduplication of only block E).

It should be appreciated that the situation in FIG. 3 provides extremely efficient storage since all opportunities to deduplicate are performed. However, it should be further appreciated that the situation in FIG. 3 results in fragmentation of LUN 3. In particular, the block sequence QRST and the block sequence VWX are disconnected because block E has been deduplicated. Such fragmentation may result in less efficient storage device operation and longer latencies (e.g., longer average seek time).

On the other hand, suppose that the user directs the data storage equipment 24 not to deduplicate "small match" block sequences. As shown in FIG. 4, the data storage equipment 24 still deduplicates the "long" sequence ABCDEFGH in LUN 2 since LUN 1 already stores the same "long" sequence ABCDEFGH. However, as further shown in FIG. 4, the data storage equipment 24 does not deduplicate block E even though LUN 1 already stores block E (block E of LUN 3 is shaded to indicate it has not been deduplicated). Here, the "long" sequence QRSTEVWX in LUN 3 remains intact and can be stored in adjacent blocks in secondary storage for efficient access (all of the blocks 100 of LUN 3 are shaded to indicate real data).

It should be appreciated that the situation in FIG. 4 still provides efficient storage since opportunities to deduplicate are still performed (e.g., see LUN 2). However, it should be further appreciated that the situation in FIG. 4 results in less fragmentation than that of FIG. 3. In particular, the block E of the "long" sequence QRSTEVWX in LUN 3 is not deduplicated so the "long" sequence QRSTEVWX in LUN 3 remains intact. Such a situation results in improved operation (e.g., less fragmentation and shorter average seek time). Further details will now be provided with reference to FIG. 5.

Figure 5:
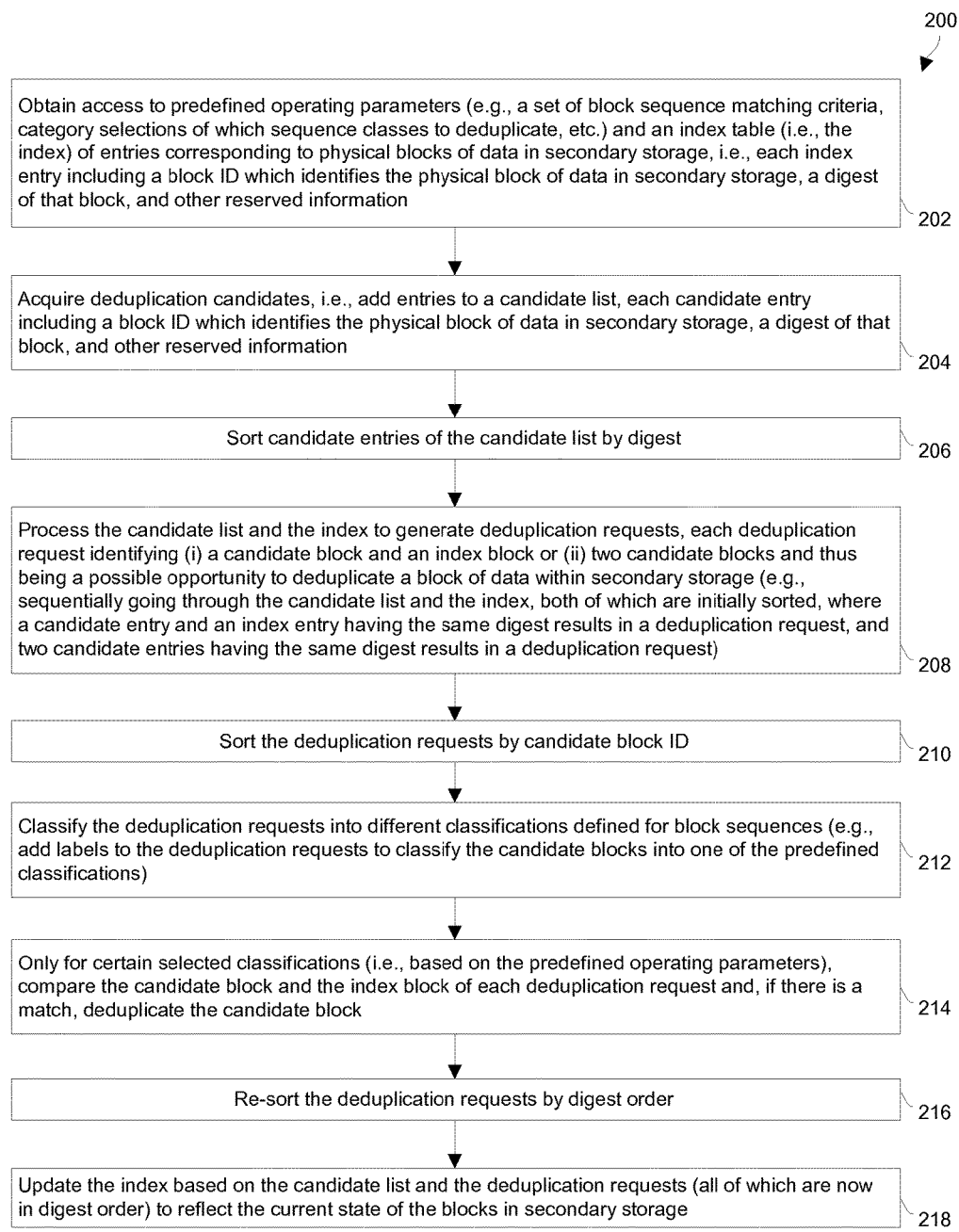
FIG. 5 is a flowchart of a procedure which is performed by the data storage equipment of FIG. 2.

FIG. 5 is a flowchart of a procedure 200 which is performed by specialized circuitry of the data storage equipment 24. Recall that this specialized circuitry is formed by the processing circuitry 74 executing in accordance with the specialized instructions and data 84 (also see FIG. 2).

At 202, the specialized circuitry of the data storage equipment 24 starts by obtaining access to predefined operating parameters (e.g., a set of block sequence matching criteria, category selections of which sequence classes to deduplicate, etc.) and an index table (hereafter, the "index") of entries corresponding to physical blocks of data in secondary storage. The predefined operating parameters can be initially set by a user or based on preset default settings, and define the various sequence classes as well as indicate which classes are to be and are not to be deduplicated. Each index entry of the index includes (i) a block ID which identifies a particular physical block in secondary storage, (ii) a digest (i.e., a hash value, fingerprint, checksum, etc.) of the data in that block, and (iii) other reserved information. The index is generated cumulatively by previous deduplication operations and resides in secondary storage sorted by digest.

At 204, the specialized circuitry of the data storage system 24 acquires deduplication candidates. In particular, as each block 100 is written to secondary storage (also see FIGS. 3 and 4), the specialized circuitry adds an entry to a candidate list (i.e., a history or log of data blocks which are added to secondary storage). Each candidate entry of the candidate list includes (i) a block ID which identifies the physical block of data in secondary storage, (ii) a digest of that data in that block, and (iii) other reserved information.

At 206, the specialized circuitry sorts the candidate entries of the candidate list by digest (i.e., in order based on digest). The specialized circuitry may begin 206 in response to a wake up signal (e.g., from a scheduler, in response to a detected event, etc.), or in response to a user command.

At 208, the specialized circuitry processes the candidate list and the index to generate deduplication requests, each deduplication request identifying (i) a candidate block and an index block, or (ii) two candidate blocks, and thus identifying a possible opportunity to deduplicate a block of data within secondary storage. In particular, since both the candidate list and the index are sorted by digest, the specialized circuitry is able to go through these structures sequentially. If the candidate list and the index have the same digest, the specialized circuitry generates a deduplication request to evaluate whether to deduplicate the corresponding blocks. Similarly, if two entries on the candidate list have the same digest, the specialized circuitry generates a deduplication request to evaluate whether to deduplicate the corresponding blocks.

At 210, the specialized circuitry sorts the deduplication requests by candidate block ID, i.e., by the block ID of the corresponding candidate entry in the candidate list. At this point, the deduplication requests are ready for classification into various categories such as an "exact long match" category, a "disrupted long match" category, a "loosely long match" category, and a "short match" category.

At 212, the specialized circuitry classifies the deduplication requests into the different classifications defined for block sequences. Such classification is based on an evaluation of each sequence of candidate blocks identified by the deduplication requests against the set of block sequence matching criteria (a minimum deduplication length parameter M, a maximum disruption length parameter N, etc.). Details of a particular implementation for this operation will be provided shortly.

At 214, the specialized circuitry compares the data of each deduplication request. In particular, the specialized circuitry verifies that the data of the candidate block and the data of the index block match. This compare operation addresses the situation of a hash collision (where the digests only indicate the possibility of the same data) by confirming that the data is truly the same, and not distinct.

At 216, the specialized circuitry re-sorts the deduplication requests by digest order in preparation of updating the index.

At 218, the specialized circuitry updates the index to reflect the current state of the blocks in secondary storage. At this point, duplication opportunities have been classified, and performed if selected for deduplication. Furthermore, the procedure 200 continues on to perform deduplication in the future.

At this point, it should be understood that the block deduplication process can be viewed as taking place in three phases. In a first phase, the data storage equipment 24 generating a list of candidate blocks which is suitable for classification (see 202 through 210 in FIG. 5). In a second phase, the data storage equipment 24 adds classifications to the list of candidate blocks where the classifications (e.g., labels) classify the candidate blocks into different categories based on the set of block sequence matching criteria (see 212 in FIG. 5). In a third phase, based on the classifications which were added to the list of candidate blocks, the data storage equipment 24 performs further block deduplication processing on first candidate blocks having a first classification while not performing further block deduplication processing on second candidate blocks having a second classification (see 214 through 218 in FIG. 5). Accordingly, deduplication can be prevented for data blocks belonging to certain types of block sequences such as for "short" sequences thus reducing fragmentation.

It should be further understood that the procedure 200 can be performed periodically (e.g., every 12 or 24 hours based on a predefined schedule). The procedure 200 also can be initiated in response to an event (e.g., a user command, a trigger from a sensor, etc.). Further details will now be provided with reference to FIG. 6.

Figure 6:
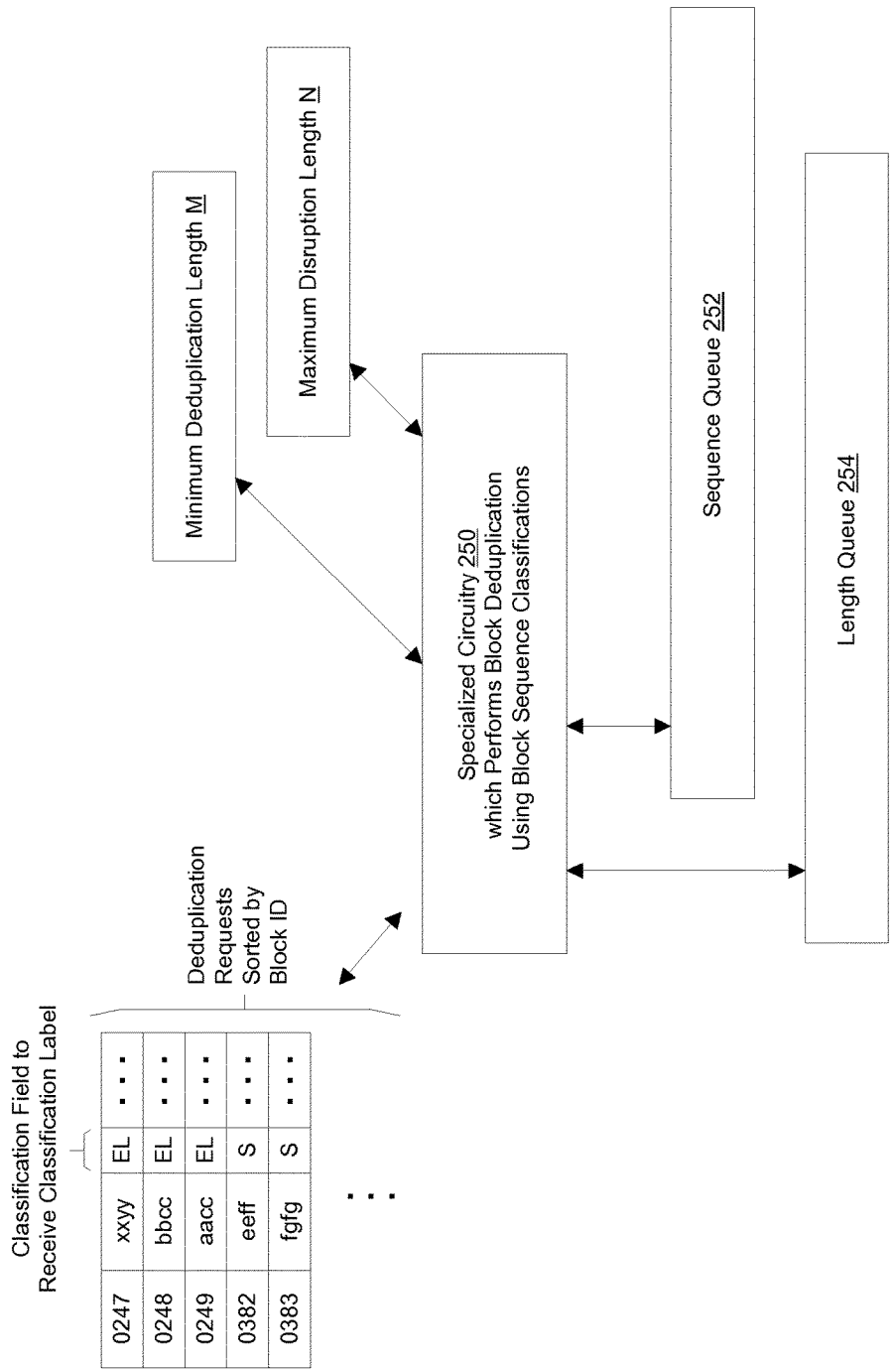
FIG. 6 is a block diagram of particular circuitry of the data storage equipment which is involved in classifying block sequences into different categories.

FIG. 6 shows the relationship between the specialized circuitry 250 which is formed by the processing circuitry 74 executing in accordance with the specialized instructions and data 84, as well as a sequence queue 252 and a length queue 254 which can reside in primary memory (i.e., RAM which is accessed directly by a processor). As will now be explained in further detail, the specialized circuitry 250 utilizes the sequence queue 252 and the length queue 254 to classify the deduplication requests into the different classifications defined for the block sequences (also see 212 in FIG. 5).

Each queue 252, 254 serves as a dedicated work space for use by the specialized circuitry 250 when evaluating the deduplication requests. In particular, each queue 252, 254 is a circular queue, or array, whose head and tail are managed by the specialized circuitry 250 and whose size can be strictly controlled making it suitable for use in primary memory. That is, the queues 252, 254 can be kept relatively small (e.g., less than 1 MB in total) so as not to interfere with normal use of primary memory to process host load and store operations. In some arrangements, the size of each queue 252, 254 is the same and set to twice the minimum deduplication length parameter M plus the maximum disruption length parameter N, plus 1 (i.e., equal to 2*(M+N+1)).

The sequence queue 252 is constructed and arranged to store candidate block IDs of the deduplication requests. In particular, when the specialized circuitry 250 goes through the deduplication requests which have been sorted based on candidate block ID, the specialized circuitry 250 places the candidate block IDs from the deduplication requests serially in entries of the sequence queue 252 thus enabling the specialized circuitry 250 to determine whether the candidate block IDs are sequential (i.e., part of a sequence). Accordingly, using the sequence queue 252, the specialized circuitry 250 is able to identify runs of adjacent blocks based on the candidate block IDs. Moreover, the sequence queue 252 serves as a log of which candidate blocks are being processed and thus require classification labeling.

Furthermore, the length queue 254 is constructed and arranged to store length values or counts of the numbers of blocks in the series of candidate block IDs placed in the sequence queue 252. Accordingly, the specialized circuitry 250 can refer to the length values in the length queue 254 to ascertain whether a particular series satisfies the requirements for a particular sequence classification (e.g., by comparing the length values to the minimum deduplication length parameter M and/or the maximum disruption length parameter N). Further details will now be provided with reference to an example.

Suppose that the minimum deduplication length parameter M is set to 8, and that the maximum disruption length parameter N is set to 2. Further suppose that the deduplication requests are sorted by block ID and ready for processing by the specialized circuitry 250 (see 210 in FIG. 5).

At this point, the specialized circuitry 250 is ready to classify the blocks of the deduplication requests (see 212 in FIG. 5). To begin such classification, the specialized circuitry 250 copies the block IDs of the deduplication requests into the sequence queue 252 and concurrently updates a length value or count of the number of block IDs that are in each sequence of adjacent blocks.

By way of example, suppose that the specialized circuitry 250 individually copies block IDs of the deduplication requests and places the block IDs in the sequence queue 252 as follows:

005, 006, 007, 008, 009, 010, 012, 013, 036, 037, . . . .
Alternatively, the specialized circuitry 250 can copy the entire deduplication request into the sequence queue 252 (for easier adding of a classification label to each deduplication request). As the specialized circuitry 250 individually copies the block IDs of the deduplication requests into the sequence queue 252, the specialized circuitry 250 detects whether the next block ID copied into the sequence queue 252 is adjacent to the last block ID to form a sequence of adjacent blocks and, if so, increments a count which is associated with that series.

Along these lines, for a first sequence S0, the specialized circuitry 250 copies 005 into the sequence queue 252 and increments a length value for the sequence s0 to indicate that the length of sequence S0 is 1. Next, the specialized circuitry 250 copies 006 into the sequence queue 252 and increments the length value for the sequence s0 to indicate that the length of sequence S0 is 2. Additionally, the specialized circuitry 250 copies 007 into the sequence queue 252 and increments the length value for the sequence s0 to indicate that the length of sequence S0 is 3, and so on.

Eventually, the specialized circuitry 250 copies "005, 006, 007, 008, 009, 010, 012, 013" into the sequence queue 252, and increments the length value for the first sequence S0 to 8. When the specialized circuitry 250 copies the next block ID "036" into the sequence queue 252, the specialized circuitry 250 detects that the block ID "036" is not adjacent to the last block ID of "013". Accordingly, the specialized circuitry 250 concludes that the sequence S0 contains exactly eight (8) blocks and classifies the deduplication requests for the eight (8) blocks as "long" since the number of blocks in the sequence S0 is greater than or equal to the minimum deduplication length parameter M which equals 8. Furthermore, since the sequence S0 has no disruptions, the specialized circuitry 250 specifically classifies the sequence S0 as an "exact long" sequence. As a result, the specialized circuitry 250 stores an "exact long" label (e.g., "EL") in a classification field of each deduplication request for the block IDs 005, 006, 007, 008, 009, 010, 012, 013.

It should be understood that, if the sequence S0 had disruptions but if the number of disruptions was less than or equal to the maximum disruption length parameter N (e.g., 2), the specialized circuitry 250 would classify the sequence S0 as a "disrupted long match" sequence and store a "disrupted long match" label (e.g., "DL") in the classification field of each deduplication request for the sequence S0. Alternatively, if the sequence S0 had disruptions but if the number of disruptions was more than the maximum disruption length parameter N (e.g., 2), the specialized circuitry 250 would classify the sequence S0 as a "loosely long match" sequence and store a "loosely long match" label (e.g., "LL") in the classification field of each deduplication request for the sequence S0.

As another example, suppose that the specialized circuitry 250 individually copies further block IDs of the deduplication requests and places the block IDs in the sequence queue 252 as follows:

036, 037, 045, 046, 047, 061, 088, 089, 090, 099, . . . .
As the specialized circuitry 250 individually copies the block IDs of the deduplication requests into the sequence queue 252, the specialized circuitry 250 determines that there is a new sequence S1 of 036, 037 copied to the sequence queue 252. In particular, as the specialized circuitry 250 copies 036 to the sequence queue 252, the specialized circuitry 250 determines that the 036 is not adjacent to the last block ID of 013 which was copied to the sequence queue 252. Accordingly, the specialized circuitry 250 sets up a new length value for the sequence S1 in the length queue 254 and sets the length value equal to 1.

Next, the specialized circuitry 250 copies the block ID 037 into the sequence queue 252. Since 037 is adjacent 036, the specialized circuitry 250 increments the length value in the length queue 254 for the sequence S1 from 1 to 2. Subsequently, the specialized circuitry 250 copies the block ID 045 into the sequence queue 252 and determines that 045 is not adjacent to 037 thus ending the sequence S1. Since the sequence S1 contains only two (2) blocks, the specialized circuitry 250 classifies the deduplication requests for the sequence S1 as a "short" sequence since the number of blocks in the sequence S1 is less than the minimum deduplication length parameter M which equals 8. As a result, the specialized circuitry 250 stores a "short" label (e.g., "S") in a classification field of each deduplication request for the block IDs 036, 037.

The specialized circuitry 250 continues processing the deduplication requests until it has processed all of the deduplication requests. At this point, each deduplication request now has a label indicating what type of sequence the block of that deduplication request belongs to. For example, "EL" identifies the "exact long match" category. "DL"

identifies the "disrupted long match" category. "LL" identifies the "loosely long match" category. "S" identifies the "short match" category.

With the block of the deduplication requests now properly categorized based on the set of block sequence matching criteria, the specialized circuitry 250 proceeds to perform actual deduplication when appropriate (see 214 in FIG. 5). Along these lines, suppose that the user selected all "long" block sequences for deduplication, but did not select "short match" block sequences for deduplication. In this situation, the specialized circuitry 250 does not attempt to deduplicate the blocks of the deduplication requests that are labeled "S", i.e., blocks of the "short match" category. As a result, the data storage equipment 24 may experience less fragmentation.

As described above, improved techniques are directed to performing block deduplication using block sequence classifications. Such classifications may be based on a set of block sequence matching criteria and thus enable categorization of different block sequences (e.g., a perfectly matching long block sequence, a long block sequence with some disruptions, a long block sequence of the same blocks but in no matching order, a short block sequence, etc.). Accordingly, a user can decide what type of deduplication to perform (e.g., deduplicate only perfectly matching long block sequences, deduplicate all long block sequences even those with blocks out of order, deduplicate all matching blocks, and so on). Such a feature enhances the user's ability to finely tune storage operations.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described blocks can be of any size. In one arrangement, the data storage equipment 24 performs deduplication on 8 KB blocks. In other arrangements, the data storage equipment 24 performs deduplication on 16 KB blocks, 32 KB blocks, 64 KB blocks, and so on.

Furthermore, the above-described data storage equipment 24 was explained above as distinguishing between four different types of sequences by way of example only: "exact long match" sequences, "disrupted long match" sequences, "loosely long match" sequences, and "short match" sequences. In other arrangements, the data storage equipment 24 defines more types of sequences, less types of sequences, other types of sequences, and so on. Such modifications and enhancements are intended to belong to various embodiments of the disclosure.

What is claimed is:

1. A computer-implemented method of performing block deduplication, the computer-implemented method comprising:
    generating a list of candidate blocks;
    adding classifications to the list of candidate blocks, the classifications classifying the candidate blocks on the list into different categories based on the candidate blocks belonging to block sequences that satisfy specified block sequence matching criteria for one or more data blocks that belong to the block sequences,
    wherein the specified block sequence matching criteria include at least (i) a first criterion that relates to a specified number of matching data blocks in the respective block sequences, and (ii) a second criterion that relates to a specified ordering of matching data blocks in the respective block sequences;
    based on the classifications added to the list of candidate blocks, performing further block deduplication processing on first candidate blocks having a first classification while not performing further block deduplication processing on second candidate blocks having a second classification,
    wherein adding the classifications to the list of candidate blocks includes:
        labeling at least some of the first candidate blocks as belonging to "exact long match" sequences; and
        labeling at least some of the second candidate blocks as belonging to "short match" sequences, and
    wherein performing the further block deduplication processing on the first candidate blocks having the first classification while not performing the further block deduplication processing on the second candidate blocks having the second classification includes:
        verifying that data in the first candidate blocks truly matches data which was previously stored on a set of storage devices while ignoring whether data in the second candidate blocks truly matches data which was previously stored on the set of storage devices; and
    receiving, as one of the specified block sequence matching criteria, a minimum deduplication length value,
    wherein each "exact long match" sequence includes a sequence of adjacent blocks which is at least the minimum deduplication length value in length, and
    wherein each "short match" sequence includes a sequence of adjacent blocks which is less than the minimum deduplication length value in length.

2. A computer-implemented method of performing block deduplication, the computer-implemented method comprising:
    generating a list of candidate blocks;
    adding classifications to the list of candidate blocks, the classifications classifying the candidate blocks on the list into different categories based on the candidate blocks belonging to block sequences that satisfy specified block sequence matching criteria for one or more data blocks that belong to the block sequences,
    wherein the specified block sequence matching criteria include at least (i) a first criterion that relates to a specified number of matching data blocks in the respective block sequences, and (ii) a second criterion that relates to a specified ordering of matching data blocks in the respective block sequences; and based on the classifications added to the list of candidate blocks, performing further block deduplication processing on first candidate blocks having a first classification while not performing further block deduplication processing on second candidate blocks having a second classification, wherein the classifications include:
an "exact long match" category, wherein the exact long match category is based on the candidate blocks belonging to block sequences that satisfy (i) the first criterion in which the specified number of matching data blocks corresponds to at least a minimum deduplication length value, and (ii) the second criterion in which the specified ordering corresponds to an exact match ordering of the matching data blocks in the respective block sequences;

a "disrupted long match" category, wherein the disrupted long match category is based on the candidate blocks belonging to block sequences that satisfy (i) the first criterion in which the specified number of matching data blocks corresponds to at least the minimum deduplication length value, and (ii) the second criterion in which the specified ordering corresponds to no more than a maximum disruption length number of the matching data blocks being out of order in the respective block sequences;

a "loosely long match" category, wherein the loosely long match category is based on the candidate blocks belonging to block sequences that satisfy (i) the first criterion in which the specified number of matching data blocks corresponds to at least the minimum deduplication length value, and (ii) the second criterion in which the specified ordering corresponds to more than the maximum disruption length number of the matching data blocks being out of order in the respective block sequences; and a "short match" category, wherein the short match category is based on the candidate blocks belonging to block sequences that satisfy (i) the first criterion in which the specified number of matching data blocks corresponds to less than the minimum deduplication length value, and (ii) the second criterion in which the specified ordering corresponds to the exact match ordering of the matching data blocks in the respective block sequences, and wherein adding the classifications to the list of candidate blocks includes labeling each candidate block on the list as belonging to one of the "exact long match" category, the "disrupted long match" category, the "loosely long match" category, and the "short match" category.

3. A computer-implemented method as in claim 2, further comprising:
receiving, as the first criterion, the minimum deduplication length value, and
receiving, as the second criterion, the maximum disruption length number; and
wherein labeling each candidate block on the list is based on the minimum deduplication length value and the maximum disruption length number.

4. A computer-implemented method as in claim 1, further comprising:
after verifying that the data in the first candidate blocks truly matches data which was previously stored on a set of storage devices, deduplicating all first candidate blocks having data which truly matches data which was previously stored on the set of storage devices.

5. A computer-implemented method as in claim 1 wherein adding the classifications to the list of candidate blocks further includes:
labeling at least some of the first candidate blocks as belonging to "disrupted long match" sequences.

6. A computer-implemented method as in claim 5, further comprising:
receiving, as another of the specified block sequence matching criteria, a maximum disruption length number; and
wherein each "disrupted long match" sequence includes a sequence of adjacent blocks which is at least the minimum deduplication length value in length and which includes a disrupted portion that includes less than or equal to the maximum disruption length number of the adjacent blocks in the sequence.

7. A computer-implemented method as in claim 6 wherein adding the classifications to the list of candidate blocks further includes:
labeling at least some of the first candidate blocks as belonging to "loosely long match" sequences; and
wherein each "loosely long match" sequence includes a sequence of adjacent blocks which is at least the minimum deduplication length value in length and which includes a disrupted portion that includes greater than the maximum disruption length number of the adjacent blocks in the sequence.

8. Data storage equipment, comprising:
a host interface to communicate with an external host computer;
memory; and
control circuitry coupled to the host interface and the memory, the memory storing instructions which, when carried out by the control circuitry, cause the control circuitry to:
generate a list of candidate blocks, each candidate block on the list having been received by the data storage equipment through the host interface;
add classifications to the list of candidate blocks, the classifications classifying the candidate blocks on the list into different categories based on the candidate blocks belonging to block sequences that satisfy specified block sequence matching criteria for one or more data blocks that belong to the block sequences, wherein the specified block sequence matching criteria include at least (i) a first criterion that relates to a specified number of matching data blocks in the respective block sequences, and (ii) a second criterion that relates to a specified ordering of matching data blocks in the respective block sequences; and
based on the classifications added to the list of candidate blocks, perform further block deduplication processing on first candidate blocks having a first classification while not performing further block deduplication processing on second candidate blocks having a second classification, wherein the classifications include:
an "exact long match" category, wherein the exact long match category is based on the candidate blocks belonging to block sequences that satisfy (i) the first criterion in which the specified number of matching data blocks corresponds to at least a minimum deduplication length value, and (ii) the second criterion in which the specified ordering corresponds to an exact match ordering of the matching data blocks in the respective block sequences;

a "disrupted long match" category, wherein the disrupted long match category is based on the candidate blocks belonging to block sequences that satisfy (i) the first criterion in which the specified number of matching data blocks corresponds to at least the minimum deduplication length value, and (ii) the second criterion in which the specified ordering corresponds to no more than a maximum disruption length number of the matching data blocks being out of order in the respective block sequences;

a "loosely long match" category, wherein the loosely long match category is based on the candidate blocks belonging to block sequences that satisfy (i) the first criterion in which the specified number of matching data blocks corresponds to at least the minimum deduplication length value, and (ii) the second criterion in which the specified ordering corresponds to more than the maximum disruption length number of the matching data blocks being out of order in the respective block sequences; and a "short match" category, wherein the short match category is based on the candidate blocks belonging to block sequences that satisfy (i) the first criterion in which the specified number of matching data blocks corresponds to less than the minimum deduplication length value, and (ii) the second criterion in which the specified ordering corresponds to the exact match ordering of the matching data blocks in the respective block sequences, and wherein the control circuitry, when adding the classifications to the list of candidate blocks, is constructed and arranged to:

label each candidate block on the list as belonging to one of the "exact long match" category, the "disrupted long match" category, the "loosely long match" category, and the "short match" category.

9. Data storage equipment as in claim 8 wherein the control circuitry is further constructed and arranged to:

receive, as the first criterion, the minimum deduplication length value, and receive, as the second criterion, the maximum disruption length number; and wherein the control circuitry labels each candidate block on the list is based on the minimum deduplication length value and the maximum disruption length number.

10. Data storage equipment as in claim 9 wherein the control circuitry, when performing the further block deduplication processing on the first candidate blocks having the first classification while not performing the further block deduplication processing on the second candidate blocks having the second classification, is constructed and arranged to:

verify that data in the first candidate blocks truly matches data which was previously stored on a set of storage devices while ignoring whether data in the second candidate blocks truly matches data which was previously stored on the set of storage devices.

11. Data storage equipment as in claim 10 wherein the control circuitry is further constructed and arranged to:

after verifying that the data in the first candidate blocks truly matches data which was previously stored on a set of storage devices, deduplicate all first candidate blocks having data which truly matches data which was previously stored on the set of storage devices.

12. A computer program product having a non-transitory computer readable medium which stores a set of instructions to perform block deduplication, the set of instructions, when carried out by computerized circuitry, causing the computerized circuitry to perform a method of:

generating a list of candidate blocks;

adding classifications to the list of candidate blocks, the classifications classifying the candidate blocks on the list into different categories based on the candidate blocks belonging to block sequences that satisfy specified block sequence matching criteria for one or more data blocks that belong to the block sequences, wherein the specified block sequence matching criteria include at least (i) a first criterion that relates to a specified number of matching data blocks in the respective block sequences, and (ii) a second criterion that relates to a specified ordering of matching data blocks in the respective block sequences; and based on the classifications added to the list of candidate blocks, performing further block deduplication processing on first candidate blocks having a first classification while not performing further block deduplication processing on second candidate blocks having a second classification, wherein the classifications include:

an "exact long match" category, wherein the exact long match category is based on the candidate blocks belonging to block sequences that satisfy (i) the first criterion in which the specified number of matching data blocks corresponds to at least a minimum deduplication length value, and (ii) the second criterion in which the specified ordering corresponds to an exact match ordering of the matching data blocks in the respective block sequences;

a "disrupted long match" category, wherein the disrupted long match category is based on the candidate blocks belonging to block sequences that satisfy (i) the first criterion in which the specified number of matching data blocks corresponds to at least the minimum deduplication length value, and (ii) the second criterion in which the specified ordering corresponds to no more than a maximum disruption length number of the matching data blocks being out of order in the respective block sequences;

a "loosely long match" category, wherein the loosely long match category is based on the candidate blocks belonging to block sequences that satisfy (i) the first criterion in which the specified number of matching data blocks corresponds to at least the minimum deduplication length value, and (ii) the second criterion in which the specified ordering corresponds to more than the maximum disruption length number of the matching data blocks being out of order in the respective block sequences; and a "short match" category, wherein the short match category is based on the candidate blocks belonging to block sequences that satisfy (i) the first criterion in which the specified number of matching data blocks corresponds to less than the minimum deduplication length value, and (ii) the second criterion in which the specified ordering corresponds to the exact match ordering of the matching data blocks in the respective block sequences, and wherein adding the classifications to the list of candidate blocks includes labeling each candidate block on the list as belonging to one of the "exact long match" category, the "disrupted long match" category, the "loosely long match" category, and the "short match" category.

13. A computer program product as in claim 12 wherein the method further comprises:
receiving, as the first criterion, the minimum deduplication length value, and
receiving, as the second criterion, the maximum disruption length number; and
wherein labeling each candidate block on the list is based on the minimum deduplication length value and the maximum disruption length number.

14. A computer program product as in claim 13 wherein at least some of the first candidate blocks form a "exact long match" sequence which includes a sequence of adjacent blocks which is at least the minimum deduplication length value in length; and
wherein at least some of the second candidate blocks form a "short match" sequence which includes a sequence of adjacent blocks which is less than the minimum deduplication length value in length.

15. A computer program product as in claim 14 wherein at least some of the candidate blocks, which are labeled as belonging to the "disrupted long match" category, belong to a "disrupted long match" sequence which includes a sequence of adjacent blocks which is at least the minimum deduplication length value in length and which includes a disrupted portion that includes less than or equal to the maximum disruption length number of the adjacent blocks in the sequence; and
wherein at least some of the candidate blocks, which are labeled as belonging to the "loosely long match" category, belong to a "loosely long match" sequence which includes a sequence of adjacent blocks which is at least the minimum deduplication length value in length and which includes a disrupted portion that is greater than the maximum disruption length number of the adjacent blocks in the sequence.

16. A computer-implemented method of performing block deduplication, the computer-implemented method comprising:
generating a list of candidate blocks;
adding classifications to the list of candidate blocks, the classifications classifying the candidate blocks on the list into different categories based on the candidate blocks belonging to block sequences that satisfy specified block sequence matching criteria for one or more data blocks that belong to the block sequences,
wherein the specified block sequence matching criteria include at least (i) a first criterion that relates to a specified number of matching data blocks in the respective block sequences, and (ii) a second criterion that relates to a specified ordering of matching data blocks in the respective block sequences; and
based on the classifications added to the list of candidate blocks, performing further block deduplication processing on first candidate blocks having a first classification while not performing further block deduplication processing on second candidate blocks having a second classification,
wherein the classifications include:
an "exact long match" category, wherein the exact long match category is based on the candidate blocks belonging to block sequences that satisfy (i) the first criterion in which the specified number of matching data blocks corresponds to at least a minimum deduplication length value, and (ii) the second criterion in which the specified ordering corresponds to an exact match ordering of the matching data blocks in the respective block sequences,
wherein adding the classifications to the list of candidate blocks includes labeling at least one of the candidate blocks on the list as belonging to the exact long match category,
wherein the classifications further include:
a "disrupted long match" category, wherein the disrupted long match category is based on the candidate blocks belonging to block sequences that satisfy (i) the first criterion in which the specified number of matching data blocks corresponds to at least the minimum deduplication length value, and (ii) the second criterion in which the specified ordering corresponds to no more than a maximum disruption length number of the matching data blocks being out of order in the respective block sequences, and
wherein adding the classifications to the list of candidate blocks further includes labeling at least one of the candidate blocks on the list as belonging to the disrupted long match category.

17. A computer-implemented method as in claim 16 wherein the classifications further include:
a "loosely long match" category, wherein the loosely long match category is based on the candidate blocks belonging to block sequences that satisfy (i) the first criterion in which the specified number of matching data blocks corresponds to at least the minimum deduplication length value, and (ii) the second criterion in which the specified ordering corresponds to more than the maximum disruption length number of the matching data blocks being out of order in the respective block sequences, and
wherein adding the classifications to the list of candidate blocks further includes labeling at least one of the candidate blocks on the list as belonging to the loosely long match category.

18. A computer-implemented method as in claim 17 wherein the classifications further include:
a "short match" category, wherein the short match category is based on the candidate blocks belonging to block sequences that satisfy (i) the first criterion in which the specified number of matching data blocks corresponds to less than the minimum deduplication length value, and (ii) the second criterion in which the specified ordering corresponds to the exact match ordering of the matching data blocks in the respective block sequences, and
wherein adding the classifications to the list of candidate blocks further includes labeling at least one of the candidate blocks on the list as belonging to the short match category.

\* \* \* \* \*